May 3, 1960    W. D. DOOLEY    2,935,058
VALVE ROTATING DEVICE
Filed Jan. 3, 1958    3 Sheets-Sheet 1

INVENTOR.
WILLIAM D. DOOLEY
BY
ATTORNEY

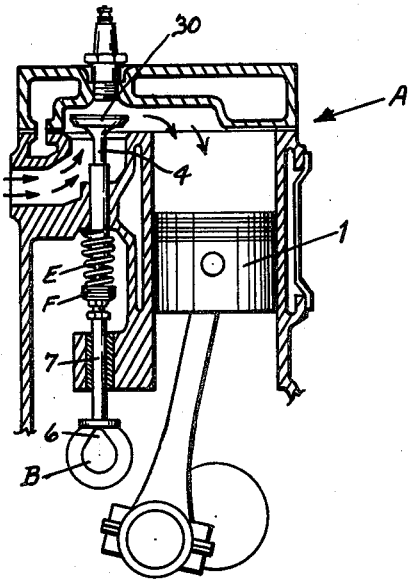
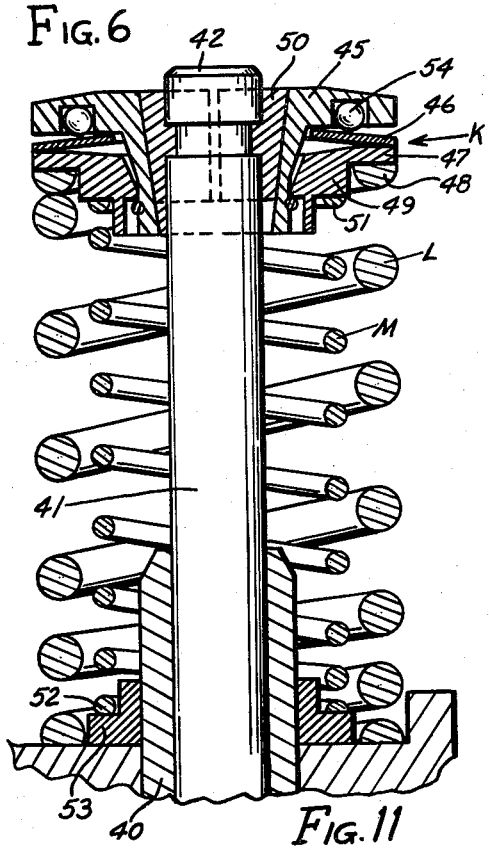
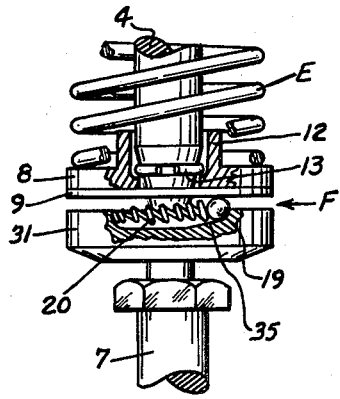
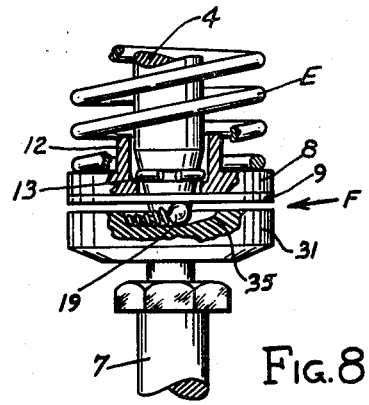
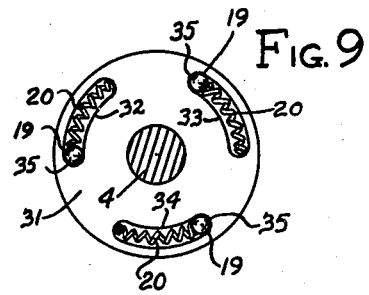
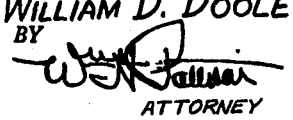

May 3, 1960  W. D. DOOLEY  2,935,058
VALVE ROTATING DEVICE
Filed Jan. 3, 1958  3 Sheets-Sheet 3
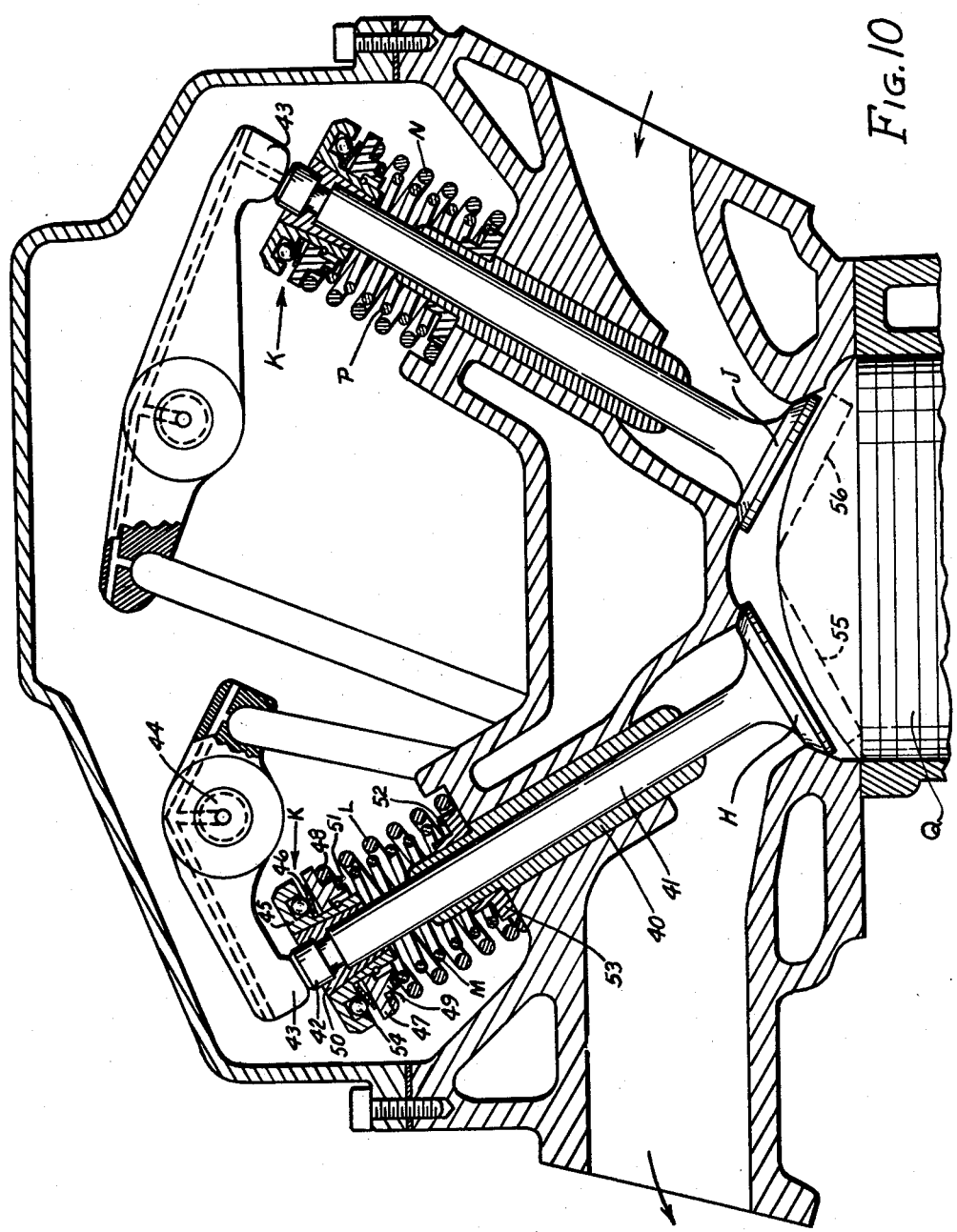
FIG. 10
INVENTOR.
WILLIAM D. DOOLEY
BY
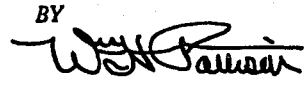
ATTORNEY

2,935,058

VALVE ROTATING DEVICE

William D. Dooley, Springfield, Ohio

Application January 3, 1958, Serial No. 706,931

19 Claims. (Cl. 123—90)

This invention relates to a valve rotating device and although it is hereinafter particularly described and the drawings illustrate the use of the device in connection with poppet valves of engines it is to be understood that the invention is not limited to this specific use since the device can be used for imparting rotative movements to any spring loaded rotatable member.

Valve rotating devices are not new and in fact numerous patents have been granted on such devices. However, such devices as are now known and are in use have many disadvantages and in fact the performance of many of them is so bad that although engines are delivered from the factory with valve rotators many distributors of these engines remove the valve rotators before making delivery following sale of the engines.

Valve rotators as heretofore made and used rotate the valve in a single direction with the result that points or spots are left on the valve or the valve seat or both and carbon deposits will accumulate on these points or spots and cause blow-by. This is particularly true in respect to exhaust valves. The minute carbon particles which move with the blow-by dilute in or become foreign subject matter in the lubricating oil and as they are abrasive by nature produce wear in all the lubricated parts of the engine. The resultant wear is of course in direct ratio to the amount of carbon and blow-by or oil dilution or contamination.

One of the objects of the present invention is to overcome the above weakness or shortcoming of valve rotators as heretofore known and used and this is accomplished by in fact providing a reverse rotative movement to the valve and causing this reverse rotative movement of the valve at the time it is seating so as to in effect accomplish a back wiping of the valve and its seat. This reverse rotative movement of the valve in reality constitutes a continuous reseating or regrinding of the valve during the operation of the engine.

Due to the previously recited shortcomings of the valve rotators as now known and used valves have become burnt and warped and this highly undesirable result is overcome by the reverse or back wiping action imparted to the valves by the present improved device.

Another object of the invention is the provision of a valve rotating device which takes advantage of the direction of movement within the engine adjacent and over the valves thereof of the exhaust and intake gases. These gases in respect to the exhaust valves move in a clockwise direction in respect to the valve heads and accordingly the present valve rotators rotate the exhaust valves in a clockwise direction. The gases in and about the intake valves of the engine move in an anti-clockwise direction in respect to the heads of the intake valves and accordingly the present rotators rotate the intake valves in an anti-clockwise direction.

The present rotators are accordingly designed to accomplish the aforementioned directions of rotation of the exhaust and intake valves and to enable the accomplishment of this the valve springs on the exhaust valves are left-hand wound springs and on the intake valves the valve springs are right-hand wound springs.

Thus it will be seen that it is an object of the present invention to provide valve rotators which will rotate the exhaust valves in a clockwise direction and the intake valves in an anti-clockwise direction.

Another object of the invention is to rotate the valves to a greater degree in the reverse direction, that is the back wiping direction, than the valves are rotated in the clockwise or anti-clockwise direction according to whether they are exhaust or intake valves.

Another object of the invention is to rotate the valves in the desired direction, that is clockwise or anti-clockwise, as the valves are being opened and to impart the reverse direction of movement to the valves as they are seated so that this reverse movement of the valves will assure, by the back wiping action, against the accumulation of carbon deposits, points or spots on the valves or the valve seats.

To assure the highest degree of efficient and satisfactory operation; to provide for practically unlimited life it is highly desirable that certain parts going into the make-up of the present improved valve rotator be made of special material and to meet particular standards. The rotator includes spherical balls and these are ground from a high grade of nickle—chromium—vanadium—steel and are held spherical to .00005. These balls are then hardened by heat treating to a hardness of Rockwell C scale of 62 to 68 which practically precludes wear and any flattening of the balls which in turn assures positive operation under all conditions found in the operation with an engine. A co-linear spring under compression is used with each of the balls and these are made from thermostatically compensated high alloy spring wires to preclude permanent set, creep or distortion as a result of repeated heating and cooling. The valve springs for the valves, which are right and left-hand turned as heretofore mentioned, are made from thermostatically compensated high alloy spring wire to assure that proper load will be maintained in both the open end closed positions of the valves and to assure that they will withstand the maximum torque or horsepower output of the engine with which they are used. The rotator itself embodies a head member beneath which is a thrust washer which rests upon the balls in a base member or main body. All of these elements are machined from a special alloy steel and are uniformly heat treated throughout their entirety with the result that all parts of these elements, including their centers, are just as hard as are the elements on their outer surfaces.

Another object of the invention is to maintain a reverse torque or twisting motion against the compression of the coil springs which are behind the balls in the raceways so as to insure the reverse wiping rotation of the valve.

A still further object of the invention is to so design the device that the ratio of valve rotation in one direction to the degree of rotation of the valve in the opposite direction is selectable. This is done by providing the proper inclination of the bottoms of the raceways at one end thereof and providing colinear springs behind the balls of the proper size and length and of the proper number of turns.

A still further object of the invention is the provision of a valve rotating device so designed that a maximum rotating and reverse wiping action is attained only at the maximum operating or governed speed under full load of the engine with which the rotator is used.

A still further object of the invention is the provision of valve rotating device which is extremely simple of construction, highly durable in use and one which can be readily and easily repaired in the field.

Other objects, novel feature of construction and improved results attained from the use of the invention will be recognized by those skilled in the art and will appear from the following description when read in the light of the accompanying drawings.

In the drawings:

Fig. 6 is a vertical cross-sectional view, with some parts appearing in elevation, of the present improved valve rotator in association with the intake valve of the engine.

Fig. 7 is an enlarged fragmentary view in elevation, with a portion of the view appearing in vertical cross section, showing the position of the parts of the rotator when the intake valve is in a closed position.

Fig. 8 is a view similar to Fig. 7 with the parts of the rotator shown in the positions they assume when the intake valve is in an open position.

Fig. 9 is a top plan view of the lower or outer part of the intake rotator.

Fig. 10 illustrates a modified form of the invention.

Fig. 11 is an enlarged detail view of the rotator for exhaust valve of Fig. 10.

Figure 1:
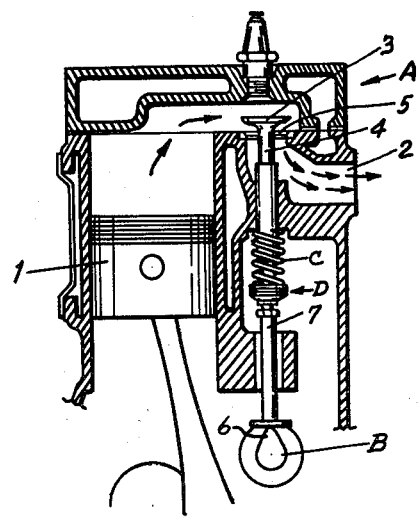
Fig. 1 is a vertical cross-sectional view, with some parts appearing in elevation, of the present improved valve rotator in association with the exhaust valve of an engine.

The drawings illustrate only a single exhaust and a single intake valve having associated therewith the improved valve rotator, but it will of course be understood that in a multi-cylinder engine there would be the required number of intake and exhaust valves and each would have a rotator associated therewith.

Description is first given of the invention in association with an exhaust valve and this is illustrated in Figs. 1 to 4 of the drawings.

A illustrates in part an engine having a conventional piston 1 and an exhaust outlet 2 for the passage of exhaust gases which escape through or by an exhaust valve having a head 3 and a depending stem 4. This valve seats periodically on the valve seat 5 and is elevated or opened by an engine driven cam B through the cam lobe 6, which operates on the lower end of a tappet or lifter 7. The valve is lifted against the tension of the valve spring C which normally tends to hold the valve in a closed position.

It is well known that the exhaust gases travel in a clockwise direction over and around the exhaust valve as they move outward to escape. The clockwise direction of travel of the exhaust gases is illustrated by arrows in Figs. 5 of the drawings.

Figure 2:
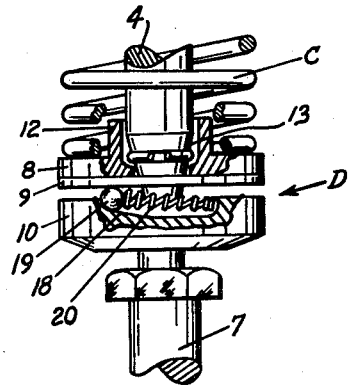
Fig. 2 is an enlarged fragmentary view in elevation, with a portion of the view appearing in vertical cross-section, showing the position of the parts of the rotator when the exhaust valve is in a closed position.
Figure 3:
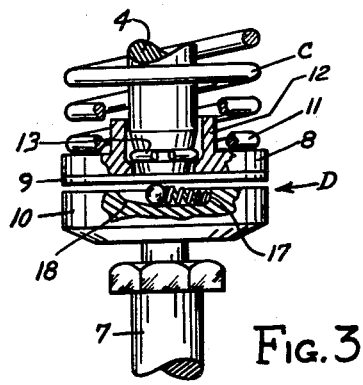
Fig. 3 is a view similar to Fig. 2 with the parts of the rotator shown in the positions they assume when the exhaust valve is in an open position.

In the present instance the valve spring C is not of conventional form because it is a left-hand wound spring which is to say that its convolutes are wound anti-clockwise. That the spring is so wound is illustrated in Figs. 1 to 3 of the drawings.

What I term the valve rotator is designated as an entirety by D and comprises a head member, or what might be termed a locating washer 8, a thrust washer 9 and a base member or main rotator body 10. These elements are most clearly illustrated in Figs. 2 and 3 of the drawings.

The three elements 8, 9 and 10 making up the rotator are preferably circular in configuration. The head member 8 might be referred to as a locating washer in that the lower end or convolute 11 of the valve spring sits upon the upper face of this member and is held against displacement therefrom by the upstanding collar 12 which extends into the convolutes of the valve spring. The head member 8 is free to rotate on the valve stem but is held against longitudinal displacement thereon by a split ring retainer 13.

The main rotator body or base member is provided in its upper face with a plurality of arc shaped grooves or raceways 14, 15 and 16. Each raceway has a deep end 17 while its opposite end is upwardly and outwardly inclined as at 18 to provide an inclined ramp or wedge. A roller ball 19 is backed up by a co-linear coil spring 20. The tension of these springs is such as to normally hold the roller balls at the upper or high ends of the ramps or wedges of the raceways.

Inasmuch as this particular rotator operates to rotate the valve in a clockwise direction upon the opening of the valve, the ramp or wedge-like ends of the raceways are at the left hand ends of the raceways as the construction is viewed in Figs. 2 and 3 of the drawings.

The base or main rotator body is suitably detachably secured to the lower end of the valve stem to rotate therewith as this element is the driving element for rotating the valve through the rotation of the valve stem.

The number of raceways utilized; the degree of inclination of the ramps or wedges and the size, number of turns and length of the springs 20 will be dependent upon the particular engine or valve with which the rotator is associated and is therefore of course variable. It will be understood of course that the specific attributes of the valve spring will be variable in accordance with the particular valve and engine being serviced.

The thrust washer 9 is intermediate the valve rotator head member 8 and base member 10 and it is free to rotate in respect to both of these elements. As clearly illustrated in Figs. 2 and 3 this thrust washer rests upon roller balls 19. Fig. 2 of the drawings illustrate the position of the parts with the valve in a closed position, while Fig. 3 illustrates the position of the parts with the valve in an open position such as is illustrated in Fig. 1. It is to be noted that in both positions, and in fact all intermediate positions, the roller balls hold the thrust washer out of direct engagement with the upper face of the base member or main rotator body element 10.

Operation.—A cycle of operation of the valve rotator is as follows. Starting with the valve in a closed position as illustrated in Fig. 2, as the cam B is rotated the lobe 6 thereof eventually opens the valve to its full open position as illustrated in Fig. 1. As the valve is opened the valve spring C is compressed and as the tension of the valve spring is increased due to its being compressed, the thrust upon the roller balls increases and eventually overcomes the thrust of the co-linear springs 20. When this occurs the roller balls are caused to run down the ramps or wedges of the raceways so that they assume the position illustrated in Fig. 3. This movement of the roller balls causes the base or main body member 10 of the rotator to rotate in a clockwise direction and as it is secured to the valve stem the valve head is of course rotated in a clockwise direction. When the valve has been lifted to the top of its upward or opening movement the lobe of the cam shaft moves or falls rapidly away from the valve lifter 7. With an engine running at any appreciable r.p.m. this movement or falling away of the cam lobe from the valve lifter is rapid. As the valve was opened the valve spring was compressed as explained, but due to it being a left hand spring a torque or twisting motion against the compression of the co-linear spring was built up and when the lobe of the cam falls away this torque built up in the valve spring is released. This torque in the valve spring will cause the valve as it becomes seated to rotate in an anti-clockwise direction and will rotate the valve in an anti-clockwise direction by a ratio of 4 to 7 as compared with the degree of rotation of the valve in a clockwise direction which occurred when the valve was being opened. When this reverse torque of the valve spring has completely expended itself the co-linear springs return the roller balls to the top of the inclines of the raceways and the parts are again in the position illustrated in Fig. 2 of the drawings. The rotator is then ready to repeat a cycle of operation upon the opening and closing of the valve. It will be understood that all of the reverse torque or energy of the valve spring was not utilized in the compression of the co-linear springs which took place as the roller balls were caused to roll down the ramps or wedges of the raceways as the valve was being opened.

Figs. 6 to 9 illustrate a valve rotator in combination with the inlet valve of an engine, which valve to benefit by the anti-clockwise direction of travel of the intake gases is rotated in an anti-clockwise direction.

Figure 5:
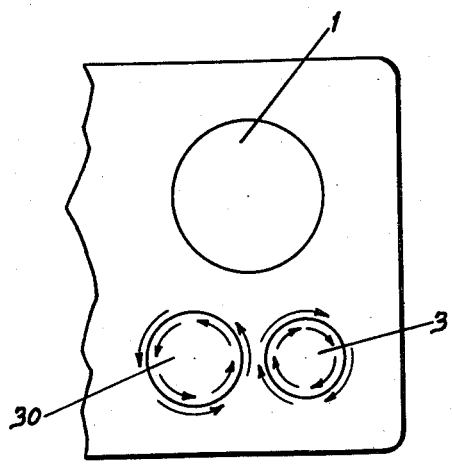
Fig. 5 is a schematic view showing the tops of the exhaust and intake valve and the direction of travel of gases thereabout.
Figure 4:
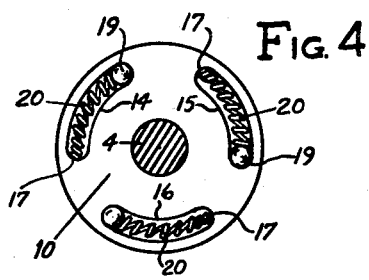
Fig. 4 is a top plan view of the lower or outer part of the exhaust rotator.

In this arrangement the valve head is designated 30 and the direction of travel of the intake gases over and around this valve is illustrated by arrows in Fig. 5 of the drawings.

The construction of the rotator does not differ greatly from that heretofore described, and description will be given only of the differences which do exist.

In this instance the valve spring E is right-hand wound.

The rotator is designated as an entirety by F and comprises a head member 8 and thrust washer 9, as heretofore described. The base member 31 differs from the previously described base member 10 in that the positions of the high and low ends of the raceways are reversed so as to impart an anti-clockwise direction of movement to the valve as it is being opened. Accordingly, the raceways 32, 33 and 34 have their high ends 35 at the right as viewed in Figs. 7, 8 and 9. The co-linear springs 20 normally hold the roller balls 19 at the top of the high ends or ramps of the raceways.

*Operation.*—Specific and detailed description of a cycle of operation of this rotator is considered unnecessary as it is merely the reverse of the cycle of operation heretofore described. It will be evident that as the valve is opened the roller balls will be caused to run down the inclined ramps of the raceways and thus rotate the valve head in an anti-clockwise direction. As the valve is opened the reverse torque is built up in the right hand wound valve spring so that when the lobe of the cam falls away from the valve lifter the valve is rotated in a clockwise direction as and when the valve head reaches its seat.

From the foregoing description it will be seen that the rotator has all of the advantages hereinbefore enumerated. The valves are positively rotated by a simple yet highly effective mechanism, which mechanism is simple and highly durable and additionally is one which can be quickly and easily taken apart and repaired in the field, that is while in use, should the necessity arise. Most important a wiping action on the valve and the valve seat is obtained, which is not only highly desirable but highly important to prevent blow-bys which result in dilutions and contamination of the engine lubricant which in turn results in execessive wear which shortens not only the life of the engine but required engine overhaul at very short periods or intervals which is highly costly in itself and costly because of the loss of the engine during its overhaul period.

Figs. 9 and 10 illustrate a modification of the inventive concept. Practically the only difference between the modified and the originally described form of the invention resides in the fact that the engine valves each have two valve springs rather than one. The modified form the invention is illustrated in conjunction with an overhead valve type of engine and particularly to a V-engine, but it is to be understood of course that this form of the invention can be equally well used in connection with valves as illustrated in Figs. 1 to 9 of the drawings.

A great majority of the new high output engines are of the overhead valve type and this is true both of the V-8's, 6's, and opposed 4's, as well as L-head and T-head engines and they are now commonly equipped with inner and outer valve springs. Two valve springs are used by the engine manufacturers for two basic reasons. In most cases there is not room enough to develop sufficient valve spring load with one spring and additionally, and most important, the second and inner spring prevents valve flutter at high engine r.p.m. Furthermore the fact that many engines are equipped with hydraulic type valve lifters or tappets has led to the necessity of more valve spring load to assure the rapid closing of the intake and exhaust valves at high engine r.p.m. against the hydraulic pressure of the hydraulic valve tappets.

The present modified form of the invention provides a valve rotating device embodying the present inventive concept which is suitable for engines of the types and kinds referred to above.

Much of the construction of the modified form of the invention is identical to that already and previously described thus obviating the necessity of detailed description of those like parts and constructions which have already been described and explained.

Referring now specifically to Fig. 10 of the drawings which illustrates an exhaust and an intake valve, H is the exhaust valve and J the intake valve. Describing first the rotator with the exhaust valve, 40 is a removable guide for the valve stem 41, the upper or outer crowned end 42 of which is engaged by and moved to an open position by the rocker arm 43 of the rocket assembly which is oscillated by the cam shaft 44.

As has been previously described, there is the valve rotator which is designated as an entirety by K and comprises a base or body member 45, a thrust washer 46, and a head 47. The outer valve spring L, because it is in association with an exhaust valve which is to be rotated in a clockwise direction, is a left hand wound spring. Its upper end 48 seats upon or against the head member 47 circumferentially exteriorly of the circumferential flange 49. The base member 45 is secured to the valve stem so that it will rotate the valve stem. This securement is obtained through a two-part lock 50.

The second and inner valve spring M is shorter than the outer valve spring and has its upper end 51 bearing on the shoulder or outer face of the flange 49 while its inner or lower end 52 rests upon the shoulder of the spring spacer 53.

With the construction thus far described the inner and outer valve springs are kept from rubbing against each other which is of course necessary and highly important.

The inner valve spring is wound oppositely to the outer valve spring, that is to say, the inner valve spring is right hand wound. The ratio of compressibility of the outer valve spring to the inner valve spring is four to one.

The modified form of the invention like the first described form, has the rotator base or head 45 provided with arcuate grooves in each of which is positioned a roller ball 54. Behind each ball is a spring similar to the coil springs 20 heretofore described, and each of the grooves or raceways are formed with an inclined bottom, as has been heretofore described.

The exhaust valve is rotated by the rotating device in a clockwise direction in the manner heretofore described in respect to the constructions appearing in Figs. 1 to 4 of the drawings.

The valve rotator associated with the intake valve J is of identical construction to that immediately above described but is rotated in an anti-clockwise direction because the outer valve spring N is right hand wound. The inner valve spring P is left hand wound and the ratio of compressibility between the outer and the inner springs is four to one. The intake valve is rotated in a clockwise direction for the reasons and in the manner described in respect to the constructions appearing in Figs. 6 to 9 of the drawings.

In connection with the modified form of the invention a dome type piston Q is illustrated and is provided in its head with clearances 55 and 56 for the exhaust and intake valves respectively.

Fig. 11 is an enlarged illustration of the exhaust valve appearing in Fig. 10 and is presented for the purpose of more clearly and distinctly illustrating the construction.

From the foregoing it will be seen that in the modified form of the invention the inventive concept is identical to that illustrated in Figs. 1 to 9 inclusive and is merely an adaptation for the engine valves where two springs rather than one are used for closing the valves.

Departures from the exact and precise constructions illustrated can be made without departing from the inventive concept and it is to be limited only by the scope of the hereinafter following claims.

What I claim is:

1. In an engine, a poppet valve, a valve spring resisting the opening of the valve and which when compressed tends to close the valve, means to open the valve, an element secured to the stem of the valve for rotating the valve in one direction upon the opening of the valve, the pressure created by the compression of the valve spring, being imparted to the valve stem attached element, means causing said pressure to rotate said element and the valve stem, the valve spring being wound in a direction opposite to the direction of rotation imparter to the valve by said valve stem attached element, a torque being built up in the valve spring upon the opening of the valve, and the released torque of said valve spring upon the seating of the valve operating to rotate said valve stem attached element for rotating the valve in the opposite direction, whereby there is a wiping action between the valve and its seat.

2. A construction as defined in claim 1 wherein, the rotation of the valve upon the opening of the valve totals a predetermined degree of rotation, and the rotation of the valve in the opposite direction upon the closure of the valve totals a rotation greater in degree than the initial rotation of the valve.

3. For use with an engine exhaust poppet valve having a stem mounted for axial reciprocation and rotation and means for lifting the valve, a valve rotating unit surrounding the valve stem adjacent its outer end, said unit comprising a rotator base member and a thrust washer and a head member superposed on the base member, the base member being non-rotatably secured to the valve stem, the thrust washer and head members being freely rotatable on the valve stem, the inner face of the base member being provided with a plurality of raceways each having a bottom end inclined upwardly and outwardly, a roller ball in each raceway, a spring behind each ball and normally holding the ball at the top of the high end of the raceway, a valve spring surrounding the valve stem and having one end seated upon the head member of the rotating unit, means to open said valve and compress the valve spring, the compression of the valve spring causing said roller balls to move toward the deep ends of their raceways to thereby cause a rotation of the base member in a clockwise direction, the valve spring being right hand wound to build up a torque upon the compression of the valve spring as the valve is opened, and said valve spring upon the seating of the valve through its torque rotating the base member and the valve in clockwise direction, whereby a wiping action is obtained between the valve and its seat.

4. For use with an engine intake poppet valve having a stem mounted for axial reciprocation and rotation and means for lifting the valve, a valve rotating unit surrounding the valve stem adjacent its outer end, said unit comprising a rotator base member and a thrust washer and a head member superposed on the base member, the base member being non-rotatably secured to the valve stem, the thrust washer and head members being freely rotatable on the valve stem, the inner face of the base member being provided with a plurality of raceways each having a bottom and inclined upwardly and outwardly, a roller ball in each raceway, a spring behind each ball and normally holding the ball at the top of the high end of the raceway, a valve spring surrounding the valve stem and having one end seated upon the head member of the rotating unit, means to open said valve and compress the valve spring, the compression of the valve spring causing said roller balls to move toward the deep ends of their raceways to thereby cause a rotation of the base member in an anti-clockwise direction, the valve spring being left hand wound to build up a torque upon the compression of the valve spring as the valve is opened, and said valve spring upon the seating of the valve through its torque rotating the base member and the valve in an anti-clockwise direction, whereby a wiping action is obtained between the valve and its seat.

5. In an engine, a poppet intake and a poppet exhaust valve, a valve spring resisting the opening of each of the valves and which when compressed tend to close the valves, means to open the valves, an element secured to the stem of each valve for rotating the valve upon the opening of the valve and the compression of the valve spring, the element which is secured to the intake valve operating to rotate the intake valve in a clockwise direction, the element which is secured to the exhaust valve operating to rotate the valve in an anti-clockwise direction, the valve spring of the intake valve being right hand wound and the valve spring of the exhaust valve being left hand wound, and said valve springs upon the seating of the valves following the opening of the valves operating to rotate the valves in the opposite direction to which they were rotated by said elements as the valves were opened, whereby there is a wiping action between the valve and its seat.

6. A construction as defined in claim 5 wherein, the rotation of the valves upon the opening of the valves totals a predetermined degree, and the rotation of the valves upon the closure of the valves totals a rotation greater in degree than the initial rotation given to the valves upon the opening of the valves.

7. For use with the exhaust and intake poppet valves of an engine where the valve stems are mounted for axial reciprocation and rotation and there is an engine driven cam shaft for raising the valves, a valve rotating unit surrounding each valve stem adjacent its outer end, each of said units comprising a rotator base member and a thrust washer and head member superposed on the base member, each base member being non-rotatably secured to its valve stem, the thrust washers and head members being freely rotatable on their respective valve stem, the inner face of each base member being provided with a plurality of raceways each having a bottom end inclined upwardly and outwardly to provide a high end in each raceway, the high ends of the raceways of the base member for the exhaust valve being at the opposite ends of the raceways as respects the high ends of the raceways of the base member for the intake valve, a roller ball in each raceway, a spring behind each ball and normally holding the ball at the top of the high shallow end of its raceway, a valve spring surrounding each valve stem and having one end seated upon the head member of its rotating unit, means to open each valve and compress the valve spring thereof, the compression of the valve springs causing said roller balls to move towards the deep ends of their raceways to thereby cause a rotation of the base member, the movement of the balls in the base member of the exhaust valve rotator causing the valve to rotate in a clockwise direction, the movement of the balls in the base member of the intake valve rotator causing the valve to rotate in an anti-clockwise direction, the valve spring of the exhaust valve being left hand wound to build up a torque upon the compression of the valve spring as the valve is opened, the valve spring of the intake valve being right hand wound to build up a torque upon the compression of the valve spring as the valve is opened, and said valve springs upon the seating of their respective valve through the torque which has been built up in them upon the opening of the valves acting to rotate its respective base member in the opposite direction to which said base member and its attached valve are rotated upon the opening of the valves, whereby a wiping action is obtained between the valve and its seat.

8. A construction as defined in claim 7 wherein the degree of rotation imparted to the valves by the valve springs is greater than the degree of rotation imparted to the valves by the movement of the balls within the raceways of the base member of the rotator.

9. A construction as defined in claim 3 wherein the degree of rotation imparted to the valve by the valve spring is greater than the degree of rotation imparted to the valve by the movement of the balls within the raceways of the base member of the rotator.

10. A construction as defined in claim 1 wherein, a second valve spring concentrically arranged within the first named valve spring also resists the opening of the valve and said springs upon compression tend to close the valve, the inner spring being wound in a direction similar to the direction of rotation imparted to the valve by the valve stem attached element.

11. A construction as defined in claim 3 wherein a second valve spring is concentrically arranged within the first named valve spring, and said valve springs surrounding the valve stem and each having an end seated upon the head member of the rotating unit, the inner valve spring being left hand wound.

12. A construction as defined in claim 4 wherein, a second valve spring is concentrically arranged within the first named valve spring, and said valve springs surrounding the valve stem and each having an end seated upon the head member of the rotating unit, the inner valve spring being right hand wound.

13. A construction as defined in claim 5 wherein, a second valve spring concentrically arranged within each of the first named valve springs also resisting the opening of the valve and which when compressed tends to close the valve, the inner spring of the intake valve being left hand wound and the inner spring of the exhaust valve being right hand wound.

14. A construction as defined in claim 7 wherein, a second valve spring is concentrically arranged within each of the first named valve springs also resisting the opening of the valve and which where compressed tends to close the valve, the inner spring of the intake valve being left hand wound and the inner spring of the exhaust valve being right hand wound.

15. A construction as defined in claim 1 wherein, a second valve spring is concentrically arranged within the first named valve spring also resists the opening of the valve and which when compressed also tends to close the valve, the inner spring being wound in a direction similar to the direction of rotation imparted to the valve by the valve stem attached element and the compressibility ratio of the outer spring to the inner spring being four to one.

16. A construction as defined in claim 3 wherein a second valve spring is concentrically arranged within the first named valve spring, and said valve springs surrounding the valve stem and each having an end seated upon the head member of the rotating unit, the inner valve spring being left hand wound and the compressibility ratio of the outer spring to the inner spring being four to one.

17. A construction as defined in claim 4 wherein a second valve spring is concentrically arranged within the first named valve spring, and said valve springs surrounding the valve stem and each having an end seated upon the head member of the rotating unit, the inner valve spring being right hand wound and the compressibility ratio of the outer spring to the inner spring being four to one.

18. A construction as defined in claim 5 wherein, a second valve spring is concentrically arranged within each of the first named valve springs which also resists the opening of the valve and which when compressed tends to close the valve, the inner spring of the intake valve being left hand wound and the inner spring of the exhaust valve being right hand wound, the compressibility ratio of the outer springs to the inner springs being four to one.

19. A construction as defined in claim 7 wherein, a second valve spring is concentrically arranged within each of the first named valve spring which also resists the opening of the valve and which when compressed tends to close the valve, the inner spring of the intake valve being left hand wound and the inner spring of the exhaust valve being right hand wound, the compressibility ratio of the outer springs to the inner springs being four to one.

References Cited in the file of this patent

UNITED STATES PATENTS

| | | |
|---|---|---|
| 2,660,990 | Zmuda et al. | Dec. 1, 1953 |
| 2,775,232 | Witzky | Dec. 25, 1956 |